Dec. 13, 1938.   J. C. COX ET AL   2,140,106
FLUID COUPLING
Filed Sept. 28, 1936    2 Sheets-Sheet 2

INVENTORS.
JOHN C. COX
WERNER F. BOLDT
GEORGE H. THOMAS
BY
THEIR ATTORNEY.

Patented Dec. 13, 1938

2,140,106

UNITED STATES PATENT OFFICE 2,140,106

FLUID COUPLING

John C. Cox, Werner F. Boldt, and George Harry Thomas, St. Louis, Mo.; said Cox and said Boldt assignors to Wagner Electric Corporation, St. Louis, Mo., a corporation of Delaware, and said Thomas assignor to Piero Mariano Salerni, Westminster, London, England Application September 28, 1936, Serial No. 102,984

6 Claims. (Cl. 60—54)

Our invention relates to fluid couplings of the Föttinger type and more particularly to the construction of such couplings from pressed metal.

One of the objects of our invention is to construct a fluid coupling of the type referred to in which the major portion thereof is formed from pressed metal parts.

Another object of our invention is to construct a fluid coupling in which the two dished annular members forming the casing of the coupling are united in an efficient and economical manner and which permits the employment of metal which may be pressed into the desired shape.

Still a further object of our invention is to produce a new type of blade or vane construction for the impeller and the turbine elements which is not only strong and durable per se but also lends considerable strength to the coupling as a unit, and which is also economical to make and easily attached to the respective elements of the coupling.

Figure 1:
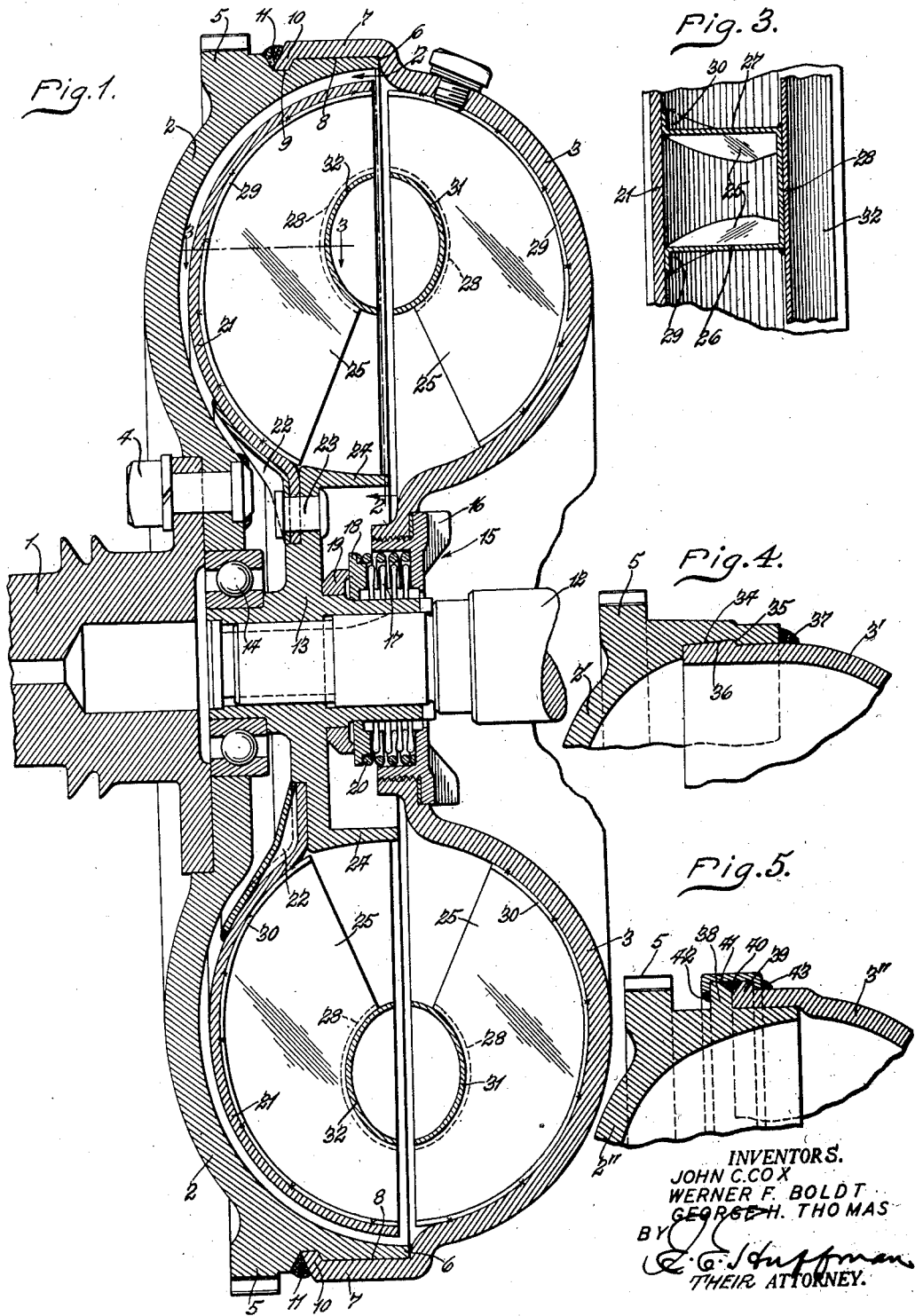
Figure 2:
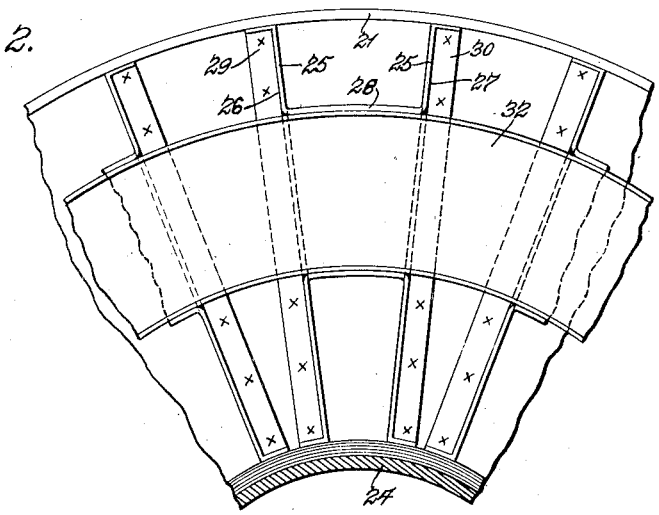
Figure 6:
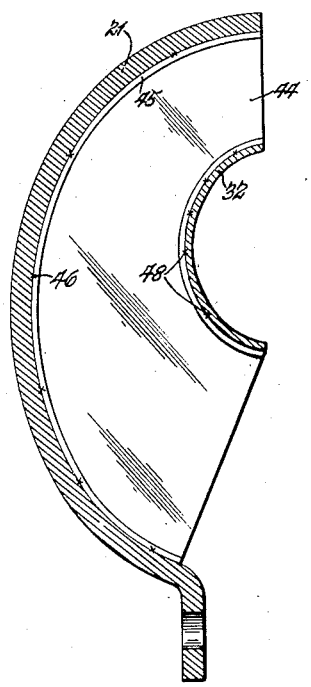
Figure 7:
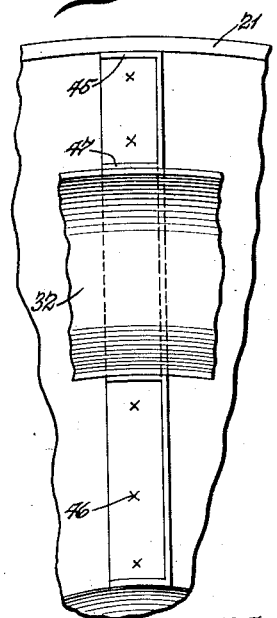

Other objects of our invention will become apparent from the following description taken in connection with the accompanying drawings in which Figure 1 is a cross-sectional view through a fluid coupling embodying our invention; Figures 2 and 3 are cross-sectional views on the lines 2—2 and 3—3 of Figure 1 showing the blade or vane construction; Figure 4 is a cross-sectional view of a modification showing a different joint construction between the two annular casing members of the coupling; Figure 5 is a cross-sectional view of still another modified joint construction; and Figures 6 and 7 are a side view and an end view, respectively, of a modified blade construction showing the manner in which it is installed.

Referring to Figures 1, 2 and 3, which disclose the preferred construction embodying our invention, numeral 1 indicates the driving shaft of the fluid coupling which may take the form of the crankshaft of an internal combustion engine or any other shaft leading from a source of power. This shaft has secured thereto the impeller of the fluid coupling which is formed of two annular dish-shaped members 2 and 3. The member 2 is bolted to the driving shaft by suitable bolts 4 and is provided with a toothed periphery 5 for cooperation with a starting gear in the event the coupling is employed on an internal combustion engine. This member 2 is preferably made of cast iron or forged steel in order that the member may have a considerable amount of weight to produce a flywheel effect and to also have sufficient strength to operate as a gear body.

However, in the event a flywheel effect is not desired and it is also not necessary to have the toothed periphery 5, this member may be made from a relatively heavy steel and pressed into the desired shape.

The other member 3 of the impeller is formed of sheet steel and pressed into the desired annular dished formation. The outer peripheral portion is provided with an annular shoulder 6 which is adapted to abut against the inner peripheral edge of member 2 when the two members are assembled. The outer periphery 7 of member 3 beyond shoulder 6 is formed in the shape of an annular flange and telescopes over the peripheral surface 8 of the member 2. This peripheral surface of member 2 is also provided with an annular groove 9 into which extends the turned down edge portion 10 of flange 7 which is welded into the groove as indicated at 11. It is thus seen that members 2 and 3 are interlocked together in addition to being welded, thus forming a very efficient joint.

In one method of assembly of the two members 2 and 3, member 3 is heated in order to slightly expand the diameter of the flange 7 and then the flange is telescoped upon the periphery of member 2 until the shoulder 6 abuts the end of member 2. The member is now allowed to cool and then the edge 10 is turned into the groove 9 after which the two members are welded together as indicated at 11. Another method is to simply press fit flange 7 on member 2 prior to turning edge 10 and then welding.

The driven shaft 12 of the coupling has splined thereto upon its inner end a hub member 13 which carries a bearing 14 positioned between the hub and member 2 in order to properly axially align the driven shaft with the driving shaft 1. The members 2 and 3 must rotate relatively to driven shaft 12 and at the same time this member must be sealed with respect to the shaft. To perform this function a suitable diaphragm seal 15 is provided. The seal shown comprises a member 16 screwed into member 3 to which is connected one end of a diaphragm 17, the other end being connected with a sealing member 18 cooperating with another sealing member 19 fixed to hub 13. The sealing members 18 and 19 are provided with cooperating lapped surfaces and these surfaces are biased into continuous engagement by coil spring 20.

The hub 13 has secured thereto an annular dish-shaped member 21 forming the body portion of the turbine of the coupling. This member is positioned within member 2 in opposed relation to member 3 and is formed from sheet metal and pressed into the desired shape as shown. The lower part of member 21 adjacent hub 2 is shown provided with a reinforcing piece 22 which is preferably welded thereto and the two members then secured to hub 13 by the rivets 23. In order to provide as smooth a path as possible for the liquid which is contained within the coupling, hub 13 is provided with a flange 24 which spans the gap between the hub and member 3.

The members 3 and 21 are both provided with radially extending fluid passages, these passages being formed by means of radially extending blades in a well known manner. The particular blade or vane construction employed in the coupling shown is an important feature of our invention. In the preferred construction a pair of blades 25 are formed from a single piece of sheet metal. As best shown in Figure 3, this metal in its final form is of U-shaped cross section with the legs 26 and 27 thereof each forming a blade 25 and base 28 forming an attaching surface which, as best indicated in Figure 1, is curved. The outer ends of legs 26 and 27 are formed with flanges 29 and 30 and the outer surface of these flanges have a curvature the same as that of members 3 and 21 and are adapted to be welded to these members in the manner shown.

The bases 28 of the members which form the blades 25 on member 3 have welded thereto a curved annular element 31 and the bases 28 of the U-shaped members which form the blades 25 on member 21 have secured thereto a curved annular element 32. These rings are welded, as shown, to the base portions 28 and are positioned in opposed relation and together form a hollow annular core. The entire arrangement of the members 3 and 21, the blades 25 and the hollow core provides the plurality of annular circuits in which the liquid in the coupling is adapted to circulate in a manner well known in this type of fluid coupling.

By forming each pair of blades by means of a U-shaped member in the manner described, very strong and rigid blades are produced which are also very easily assembled and secured to the dish-shaped members and the ring members. Also by providing a U-shaped member to form each pair of blades, the curved base of the member lends considerable strength and rigidity to the two curved elements which form the vortex ring.

Referring to Figure 4, a modified structure is shown for joining the two outside annular dished members. In the construction shown the member 2' is formed with an inner annular groove 34 presenting a shoulder 35. The member 3', which is adapted to be joined to member 2' has formed upon its peripheral surface and adjacent its inner edge a ridge 36. When assembled, this ridge 36 is adapted to fit into groove 34 and engage shoulder 35, thereby interlocking members 2' and 3' together. Member 2', prior to the assembling operation, may be heat treated and then shrunk after member 3' has been telescoped into member 2' and ridge 36 positioned in groove 34. The members 2' and 3' may also be united by a press fit. In order to insure that members 2' and 3' are at all times rigidly held in assembled relation and that the joint is leakproof, the members are welded together as indicated at 37.

Referring to Figure 5, a further modification is disclosed. In this construction member 2'' has formed on its outer periphery an annular rib 38 and member 3'', which is adapted to telescope over a portion of member 2'', is provided with an annular flange or rib 39 at its inner edge. The member 3'' can be assembled with the member 2'' by either heating and shrinking or else by a press fit. When the two members are assembled, ribs 38 and 39 are in abutting relation and cooperating therewith is an annular U-shaped locking ring 40, the legs of which receive ribs 38 and 39, thus preventing their separation. Prior to the positioning of the locking ring upon the ribs, the ribs are preferably welded together, as indicated at 41, in order to assist the locking ring in holding and sealing the ribs together and after the locking ring has been assembled on the ribs, each leg is welded to its adjacent rib in the manner indicated at 42 and 43.

Referring to Figures 6 and 7, we have disclosed a modified form of blade in which each blade is made from a separate piece of metal instead of two blades being made from a single piece as was done in the construction just described. The blade is shown as being carried by the member 21 only and it is to be understood that the construction would be the same on member 3. The crescent-shaped blade 44 is provided with an outer curved flange 45 which is secured to the inner surface of member 21 by spot welding in the manner indicated at 46. An inner curved flange 47 is formed on the blade which receives and supports the annular curved element 32, the joining of the element and flange being by spot welds as indicated at 48. In this construction it is to be noted that flange 46 of the blade extends over the entire inner surface of member 21 and that flange 47 extends over the entire outer curved surface of element 32, thus lending considerable strength and rigidity to these members which are made of pressed metal. Also by having flanges 45 and 47 extending over the entire length of the blade, the blade itself is considerably strengthened.

From the foregoing description it is readily seen that we have constructed a very strong built-up fluid coupling in which the parts are constructed of pressed metal and welded together, thereby considerably reducing the cost of manufacture.

Being aware of the possibility of other modifications in the particular structures herein described, without departing from the fundamental principles of our invention, we do not intend that its scope be limited except as set forth in the appended claims.

Having fully described our invention, what we claim as new and desire to secure by Letters Patent of the United States is:

1. In a fluid coupling of the Föttinger type, a curved annular member, a second curved annular member spaced from and in substantial concentric relation to the first member, and radially extending vanes interposed between and secured to the two annular members to produce a fluid path, each pair of said vanes comprising a member U-shaped in cross section and having the outer edges of its legs curved and secured to one of the annular members and the outer surface of its base curved and secured to the other annular member.

2. A vane construction for incorporation in a fluid coupling of the Föttinger type and comprising a single sheet of deformable metal formed in the shape of a U and having its legs which comprise the vanes substantially crescent shape, said legs being provided with means at their outer ends for attachment to a rotatable element of the fluid coupling.

3. A vane construction for incorporation in a fluid coupling of the Föttinger type and comprising a single sheet of deformable metal formed in the shape of a U and having the outer ends of its legs formed with attaching flanges presenting curved surfaces and the outer surface of its base formed to present a curved attaching surface substantially concentric with the curved surfaces of the flanges.

4. A vane construction for incorporation in a fluid coupling of the Föttinger type and comprising a sheet of metal formed to provide a member U-shaped in cross section and having its legs which comprise the vanes substantially crescent-shaped.

5. A vane construction for incorporation in a fluid coupling of the Föttinger type and comprising a sheet of metal formed to provide a member U-shaped in cross section and having its legs which comprise the vanes provided with attaching flanges at their outer ends.

6. In a fluid coupling of the Föttinger type, a curved annular member, radially extending vanes carried by said member, each pair of vanes comprising a member U-shaped in cross section and having substantially crescent-shaped legs, the outer ends of said legs being provided with flanges having curved surfaces welded to the inner surface of the curved member and the base of the U-shaped member having a curved surface, and a second annular member welded to the outer surface of the base of the U-shaped member.

JOHN C. COX.
WERNER F. BOLDT.
GEORGE HARRY THOMAS.